US006118195A

United States Patent [19]
Hauer

[11] Patent Number: 6,118,195

[45] Date of Patent: Sep. 12, 2000

[54] ELECTRIC MOTOR DRIVE FOR ECCENTRICALLY SUPPORTED CYLINDER

[75] Inventor: Horst-Walter Hauer, Würzburg, Germany

[73] Assignee: Koenig & Bauer Aktiengesellschaft, Wurzburg, Germany

[21] Appl. No.: 09/147,593

[22] PCT Filed: Aug. 1, 1997

[86] PCT No.: PCT/DE97/01632

§ 371 Date: Jan. 29, 1999

§ 102(e) Date: Jan. 29, 1999

[87] PCT Pub. No.: WO98/06581

PCT Pub. Date: Feb. 19, 1998

[30] Foreign Application Priority Data

| | | | |
|---|---|---|---|
| Aug. 9, 1996 | [DE] | Germany | 196 32 292 |
| Nov. 22, 1996 | [DE] | Germany | 196 48 413 |

[51] Int. Cl.[7] .......... H02K 7/10

[52] U.S. Cl. .......... 310/75 R; 310/78; 310/83; 310/84; 310/75 D; 310/66; 310/92

[58] Field of Search .......... 310/75 R, 90; 318/603, 568

[56] References Cited

U.S. PATENT DOCUMENTS

| | | | |
|---|---|---|---|
| 3,753,016 | 8/1973 | Klein | 310/90 |
| 3,945,266 | 3/1976 | Dufour et al. | 74/401 |
| 4,602,262 | 7/1986 | Milligan et al. | 346/160 |
| 4,707,712 | 11/1987 | Buckley et al. | 346/136 |
| 4,935,683 | 6/1990 | Kolber et al. | 318/603 |
| 5,293,107 | 3/1994 | Akeel | 318/568 |
| 5,497,220 | 3/1996 | Inomata et al. | 355/245 |
| 5,610,491 | 3/1997 | Gotz | 318/625 |
| 5,656,909 | 8/1997 | Gotz | 318/625 |
| 5,668,455 | 9/1997 | Gotz | 318/625 |

FOREIGN PATENT DOCUMENTS

| | | |
|---|---|---|
| 621133 | 4/1993 | European Pat. Off. . |
| 669208 | 8/1995 | European Pat. Off. . |
| 3432572 | 3/1985 | Germany . |
| 3825652 | 2/1990 | Germany . |
| 4126129 | 2/1993 | Germany . |
| 4138479A1 | 6/1993 | Germany . |
| 4138479C2 | 6/1993 | Germany . |
| 4322744 | 1/1995 | Germany . |
| 4422097 | 1/1996 | Germany . |
| 4430693 | 3/1996 | Germany . |

*Primary Examiner*—Elvin Enad
*Attorney, Agent, or Firm*—Jones, Tullar & Cooper, PC

[57] ABSTRACT

A cylinder of a rotary printing press is provided with a journal which is supported for rotation in an eccentric bushing. The eccentric bushing is, in turn, shiftably positioned in a lateral side frame of the printing press. The cylinder is directly driven by an electric motor. This electric motor is mounted directly on the eccentric bushing. A compensation coupling, such as a clutch is placed between the electric motor and the cylinder.

9 Claims, 3 Drawing Sheets

ELECTRIC MOTOR DRIVE FOR ECCENTRICALLY SUPPORTED CYLINDER

FIELD OF THE INVENTION

The present invention relates to a cylinder drive for a rotary printing press.

DESCRIPTION OF THE PRIOR ART

A cylinder drive for a rotary printing press in accordance with the prior art is known from DE 41 38 479 C2. A cylinder, which is shiftable in a lateral frame by means of an eccentric bush, is directly driven by means of an electric motor. To this end, a rotor of the electric motor is fixedly connected with a journal of the cylinder. A stator of the electric motor is fixedly connected with the lateral frame by means of a separate connecting device.

In this prior art device it is disadvantageous that an elaborate device for following up the stator is required. In addition, the stator and the rotor of the electric motor are not seated directly rotatable in relation to each other, so that an even air gap between the rotor and the stator is not assured. Such inaccuracies can occur, in particular, because of inaccuracies during manufacture, assembly errors or because of the follow-up separate connecting device itself. Undesired vibrations can occur because of this which, for example, can lead to mackling of the printed image.

DE 44 22 097 A1 describes an arrangement of an electric motor for driving a printing cylinder of a rotary printing press, which printing cylinder is rotatably or shiftably seated in an adjustable eccentric bush. In this device, the rotor of the electric motor is rigidly connected with the cylinder.

DE 44 30 693 A1 discloses an offset rotary printing press with a printing unit having a cylinder seated in an eccentric bush. This cylinder is directly driven by means of an electric motor, wherein a stator of the electric motor is rigidly fastened on a journal of the cylinder.

DE 34 32 572 A1 discloses a cylinder drive, wherein a rotor of an electric motor is connected with a journal of the cylinder by means of a quick-release coupling. This quick-release coupling rigidly connects the cylinder journal and the motor rotor.

SUMMARY OF THE INVENTION

The object of the present invention is directed to creating a cylinder drive for a rotary printing press.

In accordance with the invention, this object is attained by utilizing an electric motor to drive a cylinder of a rotary printing press. The cylinder is rotatably supported in an eccentric bush or bushing which, in turn, is shiftably seated in a lateral or side frame of the press. Shifting of the eccentric bushing will change the position of the axis of rotation of the cylinder. The rotor of the electric motor is connected to the journal of the cylinder by a compensation coupling or clutch which accommodates these changes in the location of the axis of rotation of the cylinder journal.

The advantages which can be achieved with the present invention reside, in particular, in that no relative movement between the stator and the rotor of an electric motor driving the cylinder will occur when the cylinder is displaced or shifted. In this way, an even air gap between the stator and the rotor is assured, so that good running properties of the electric motor are surely provided at all times.

A flanged motor, for example, is used with the cylinder drive in accordance with the present invention, and whose flange is fastened directly on the front of an eccentric bush receiving the cylinder. No elaborate separate connecting devices are required for this. Production and installation costs, as well as inaccuracies, are minimized.

If the cylinder and the electric motor are connected with each other by means of a coupling, the latter can be installed so that it compensates for errors, such as for example, axial offset, inclined position of the axes, or angular errors, so that such errors have no effect on the service life or running properties of the electric motor, for example. This is particularly advantageous in connection with cylinders which can be adjusted by means of an eccentric bush, since the cylinder can be differently stressed as a function of the position of the eccentric bush and therefore an axial offset, for example between the rotor of the electric motor and the journal of the cylinder, can be of different magnitude.

BRIEF DESCRIPTION OF THE DRAWINGS

The cylinder drive in accordance with the present invention is represented in the accompanying drawings in which.

DESCRIPTION OF THE PREFERRED EMBODIMENT

Figure 1:
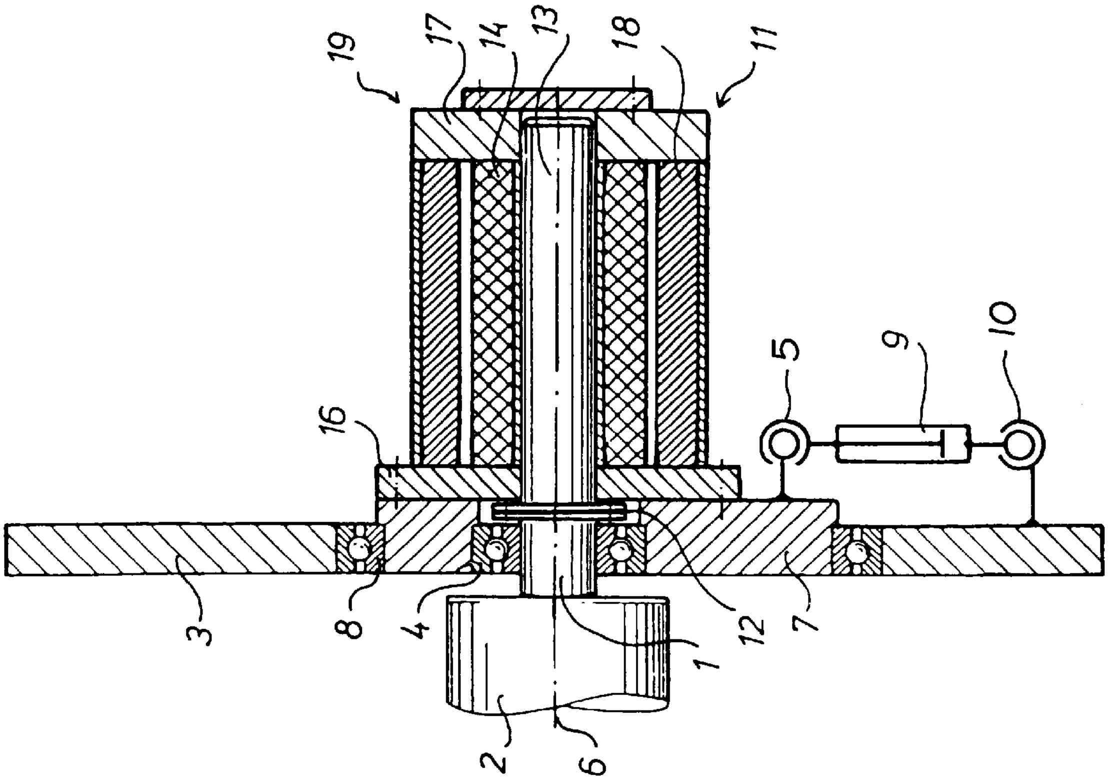
FIG. 1 is a cross-sectional view of a first preferred embodiment of the present invention and shows a drive motor mounted to a cylinder eccentric bushing and including a compensating coupling.
Figure 2:
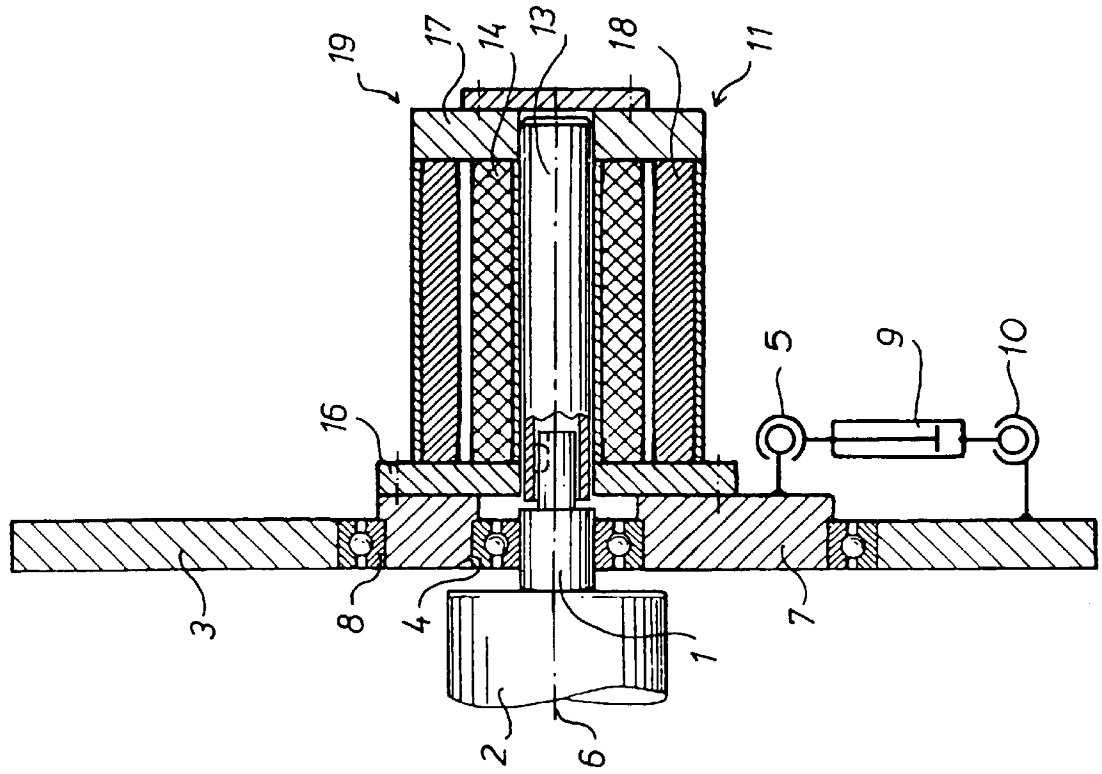
FIG. 2 is a view generally similar to FIG. 1 and showing a hollow shaft motor and a journal with a key interposed between the two.
Figure 3:
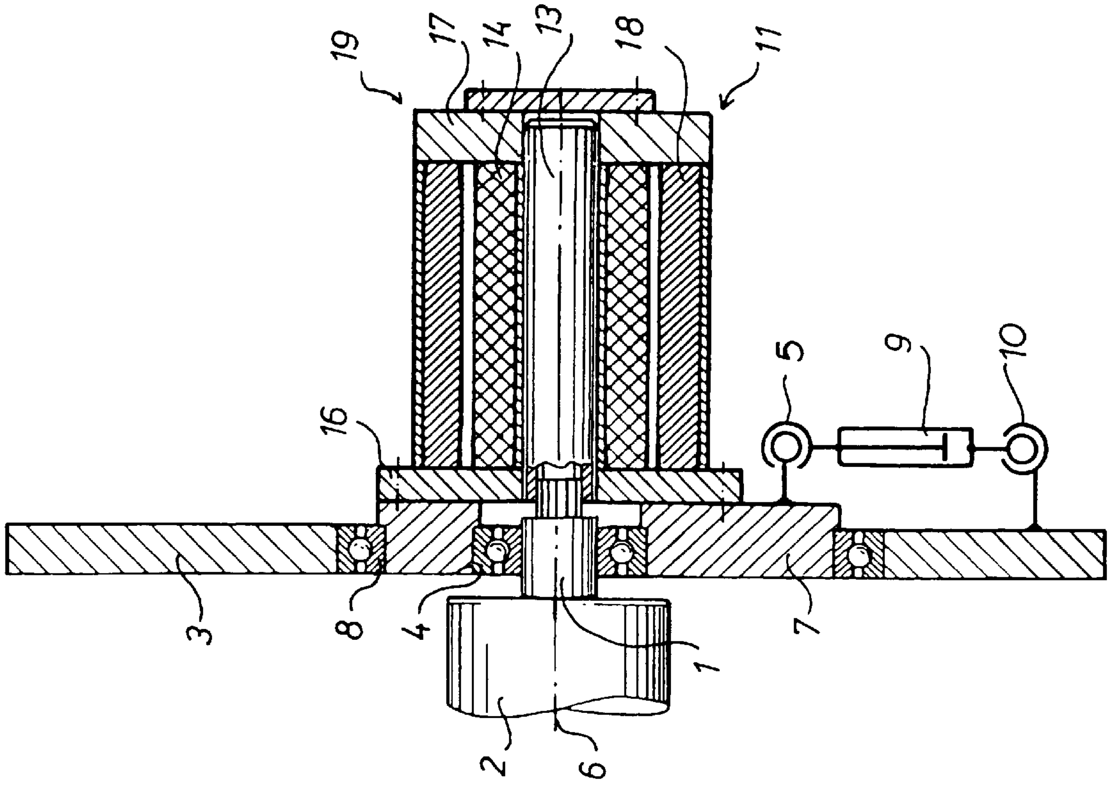
FIG. 3 is a view generally similar to FIGS. 1 and 2 and showing a motor with a planet gear arranged coaxially with the journal.

A rotating component, preferably a journal 1 of a cylinder 2, for example a forme, rubber blanket, or printing cylinder of a rotary printing press is seated, rotatable around its axis of rotation 6, in a lateral frame 3, for example by rolling journal bearing 4. This rolling journal bearing 4 is situated in an eccentric bush 7, which, in turn, is shiftably seated in the lateral frame 3 by means of an outer rolling eccentric bushing bearing 8. A first end of an actuating drive, for example a controllable work cylinder 9, engages this eccentric bush 7 by means of a first coupling 5. A second end of the work cylinder 9 is connected with the lateral frame 3 by means of a second coupling 10. Exact adjustment devices can be arranged to work together with the work cylinder 9. In this way, the eccentric bush 7 is connected with the lateral frame 3 in a manner fixed against relative rotation and adjustably, and a position of the axis of rotation 6 of the cylinder 2 in a plane defined by the lateral frame 3 can be changed by means of the eccentric bush 7.

A position-controlled electric motor 11 is provided and, which preferably works together with the cylinder 2. To this end, the free end of the journal 1 of the cylinder 2, for example, is connected in a torsion-proof manner by means of a coupling or a clutch 12 with the rotor shaft 13 of a rotor 14 of the electric motor 11. As in the example depicted in the sole drawing figure, the coupling 12 can be designed as a simple flange coupling or clutch or, for example, as a flexible compensating coupling, such as a double universal joint, or as a spiral-toothed coupling, for example. The rotor 14, or respectively the rotor shaft 13, is seated in a flange 16 and a cover 17 of a motor housing 19, for example by means of sliding bearings. The housing 19 also contains a stator 18 of the electric motor 11. The motor housing flange 16 is connected with the eccentric bush 7.

An electric motor 11, is thus provided with its stator 18, exclusively fastened on the eccentric bush 7 in this way.

Rolling bearings can also be employed in place of the sliding bearings for supporting the rotor shaft 13 in the flange 16 and cover 17. In case the stator 18 is fixedly connected with the journal 1, the internal seating of the electric motor 11 can be completely omitted.

A hollow shaft motor, which can be provided with a rotor that may be directly pushed onto the journal 1, can also be employed. In this case, the journal 1 is fixed, secure against relative rotation, with the rotor of the hollow shaft motor by means of a feather key, multi-wedge shaft or by serrations. A gear device can also be interposed between the electric motor 11 and the journal 1, which is also exclusively arranged on the eccentric bush 7. This gear device is preferably designed as a planet gear and is arranged coaxially in respect to the journal 1.

The functioning of the present cylinder 2 in accordance with the invention is as follows: if, for example, the work cylinder 9 is to be used to shift the cylinder for use of cylinder 2 in providing pressure for impressions, it exerts a force on the eccentric bush 7 in the circumferential direction. Because of this, the eccentric bush 7 is rotated or shifted, for example, in the circumferential direction until a detent, not represented, is reached. The position of the axis of rotation 6 of the cylinder 2 in respect to the lateral frame 3, and therefore in respect to a second cylinder, for example, is changed by this shifting or rotating of brushing 7. In the process, the position of the rotor 14 as well as that of the stator 18 is simultaneously changed. No relative movement is caused between the rotor 14 and the stator 18, so that an air gap between the rotor 14 and the stator 18 remains constant.

While preferred embodiments of a cylinder drive in accordance with the present invention have been set forth fully and completely hereinabove, it will be apparent to one of skill in the art that a number of changes in, for example, the size of the cylinder, the type of cylinder, the press in which the cylinder is used, and the like can be made without departing from the true scope and spirit of the subject invention which is accordingly to be limited only by the following claims.

What is claimed is:

1. A cylinder drive comprising:

a cylinder having an axis of rotation;

a cylinder journal secured to said cylinder;

an eccentric bushing receiving said cylinder journal and supporting said cylinder for rotation about said cylinder axis of rotation;

a lateral frame, said lateral frame supporting said eccentric bushing;

means for shifting said eccentric bushing in said lateral frame to change a position of said cylinder axis of rotation and said journal with respect to said lateral frame;

an electric motor, said electric motor including a motor rotor, said electric motor being arranged to rotate said cylinder; and a compensation coupling connecting said motor rotor to said cylinder journal.

2. The cylinder drive of claim 1 wherein said electric motor further includes a stator and wherein said electric motor stator is fastened to said eccentric bushing.

3. The cylinder drive of claim 1 wherein said electric motor further includes a flange and wherein said flange is secured to said eccentric bushing.

4. A cylinder drive comprising:

a cylinder having an axis of rotation;

a cylinder journal secured to said cylinder;

an eccentric bushing receiving said cylinder journal and supporting said cylinder for rotation about said cylinder axis of rotation;

a lateral frame, said lateral frame supporting said eccentric bushing;

means for shifting said eccentric bushing in said lateral frame to change a position of said cylinder axis of rotation and said journal with respect to said lateral frame;

an electric motor, said electric motor including a motor rotor, said electric motor being arranged to rotate said cylinder; and means securing said electric motor to said eccentric bushing.

5. The cylinder drive of claim 4 wherein said electric motor includes a stator and further wherein said electric motor stator is fastened to said eccentric bushing.

6. The cylinder drive of claim 4 wherein said electric motor includes a flange and further wherein said flange is secured to said eccentric bushing.

7. The cylinder drive of claim 4 wherein said electric motor has a hollow shaft and wherein said cylinder journal is received in said hollow shaft.

8. The cylinder drive of claim 4 further including a gear drive between said electric motor and said cylinder journal, said gear drive including planet gears arranged on said motor rotor.

9. The cylinder drive of claim 4 further including a compensation coupling connecting said motor rotor to said cylinder journal.

* * * * *